(12) United States Patent
Rafidi et al.

(10) Patent No.: US 12,248,471 B2
(45) Date of Patent: Mar. 11, 2025

(54) SYSTEMS AND METHODS FOR GENERATING AND DISPLAYING A DATA PIPELINE USING A NATURAL LANGUAGE QUERY, AND DESCRIBING A DATA PIPELINE USING NATURAL LANGUAGE

(71) Applicant: Palantir Technologies Inc., Denver, CO (US)

(72) Inventors: Joseph Rafidi, Washington, DC (US); James Thompson, San Francisco, CA (US); Mohamed Zaki Trache, London (GB); Felix-Gabriel Mance, London (GB); Martin Copes, London (GB)

(73) Assignee: Palantir Technologies Inc., Denver, CO (US)

( * ) Notice: Subject to any disclaimer, the term of this patent is extended or adjusted under 35 U.S.C. 154(b) by 116 days.

(21) Appl. No.: 18/087,023

(22) Filed: Dec. 22, 2022

(65) Prior Publication Data

US 2024/0045863 A1 Feb. 8, 2024

Related U.S. Application Data

(60) Provisional application No. 63/425,071, filed on Nov. 14, 2022, provisional application No. 63/395,987, filed on Aug. 8, 2022.

(51) Int. Cl.
*G06F 16/2453* (2019.01)
*G06F 16/242* (2019.01)

(52) U.S. Cl.
CPC ...... *G06F 16/24542* (2019.01); *G06F 16/243* (2019.01)

(58) Field of Classification Search
CPC ................. G06F 16/24542; G06F 16/243
(Continued)

(56) References Cited

U.S. PATENT DOCUMENTS 11,500,865 B1* 11/2022 Wang ..................... G06N 3/045
2019/0188037 A1* 6/2019 Tekelioglu .............. G06F 8/433
(Continued)

FOREIGN PATENT DOCUMENTS

EP 4322021 A1 2/2024

OTHER PUBLICATIONS

Han, Xue, et al., "Bootstrapping Natural Language Querying on Process Automation Data", 2020 IEEE International Conference on Services Computing (SCC), Beijing, China, Nov. 7-11, 2020, pp. 170-177.*
(Continued)

*Primary Examiner* — Robert Stevens
(74) *Attorney, Agent, or Firm* — Faegre Drinker Biddle & Reath LLP

(57) ABSTRACT

System and method for generating and displaying data pipelines according to certain embodiments. For example, a method includes: receiving a natural language (NL) query; receiving a model result generated based on the NL query, the model result including a query in a standard query language, the model result being generated using one or more computing models; and generating the data pipeline based at least in part on the query in the standard query language, the data pipeline comprising one or more data pipeline elements, at least one data pipeline element of the one or more pipeline elements being corresponding to a query component of the query in the standard query language.

16 Claims, 8 Drawing Sheets

(58) Field of Classification Search
USPC .......................................................... 707/718
See application file for complete search history.

(56) References Cited

U.S. PATENT DOCUMENTS

| | | | |
|---|---|---|---|
| 2020/0026790 A1* | 1/2020 | Maclean | G06F 16/904 |
| 2020/0034465 A1* | 1/2020 | Brake | G06F 16/3323 |
| 2020/0175304 A1* | 6/2020 | Vig | G06F 40/30 |
| 2020/0210427 A1* | 7/2020 | Dugan | G06F 21/6218 |
| 2020/0301916 A1 | 9/2020 | Nguyen | |
| 2021/0064775 A1* | 3/2021 | Mishra | G06F 21/6227 |
| 2021/0149936 A1 | 5/2021 | Beller et al. | |
| 2022/0043826 A1* | 2/2022 | Zorin | G06F 16/24573 |
| 2022/0050840 A1* | 2/2022 | Parravicini | G06N 5/025 |
| 2022/0100800 A1* | 3/2022 | Georgopoulos | G06N 20/00 |
| 2022/0293253 A1* | 9/2022 | Bunker | G06F 3/04842 |
| 2022/0382852 A1* | 12/2022 | Yang | G06F 16/951 |
| 2023/0078177 A1* | 3/2023 | Wang | G06F 16/243 707/760 |
| 2023/0274095 A1* | 8/2023 | Kelkar | G06F 40/49 704/9 |

OTHER PUBLICATIONS

Krishnan, Sanjay, et al., "AlphaClean: Automatic Generation of Data Cleaning Pipelines", arXiv, Cornell University, arXiv: 1904.11827v2, May 7, 2019, pp. 15 pages.*

Weir, Nathaniel, et al., "DBPal: A Fully Pluggable NL2SQL Training Profile", SIGMOD '20, Portland, OR, Jun. 14-19, 2020, pp. 2347-2361.*

Haffner, Immanuel, et al., "Fast Compilation and Execution of SQL Queries with WebAssembly", arXiv, Cornell University, arXiv: 2104.15098v2, May 3, 2021, pp. 14 pages.*

"Network interface controller", Wikipedia, downloaded from: en.wikipedia.org/wiki/Network_interface_controller, Jun. 11, 2024, pp. 1-6.*

Yang, Junwen, et al., "Auto-Pipeline: Synthesizing Complex Data Pipelines By-Target Using Reinforcement Learning and Search", arXiv, Columbia Univ., Aug. 3, 2021, (from: Proc. of the VLDB Endowment, vol. 14, No. 11), pp. 1-16.*

Ponnuswami, Ganesan, et al., "Event-Driven Pipeline for Network Management Systems", ICCCNT 2020, Kharagpur, India, Jul. 1-3, 2020, pp. 1-6.*

Microsoft Computer Dictionary, 5th Edition, Microsoft Press, Redmond, WA, © 2002, pp. 110, 141, 210-211, 442-443, 446, 459 and 510.*

European Patent Office, Extended European Search Report, dated Jun. 28, 2023, for Application No. 22215797.6, 14 pages.

European Patent Office, Extended European Search Report, dated Aug. 1, 2024, for Application No. 24162109.3, 10 pages.

John, Rogers Jeffrey Leo et al., "DataChat: An Intuitive and Collaborative Data Analytics Platform," Proceedings of the 2023 Conference on Human Information Interaction and Retrieval, ACMPUB27, New York, NY, Jun. 4, 2023, pp. 203-215, XP059090736.

* cited by examiner

SYSTEMS AND METHODS FOR GENERATING AND DISPLAYING A DATA PIPELINE USING A NATURAL LANGUAGE QUERY, AND DESCRIBING A DATA PIPELINE USING NATURAL LANGUAGE

CROSS REFERENCE TO RELATED APPLICATIONS

This application claims priority to U.S. Provisional Application No. 63/425,071, filed Nov. 14, 2022, and U.S. Provisional Application No. 63/395,987, filed Aug. 8, 2022, both of which are incorporated by reference herein for all purposes.

TECHNICAL FIELD

Certain embodiments of the present disclosure are directed to systems and methods for generating data pipelines and/or generating descriptions of data pipelines. More particularly, some embodiments of the present disclosure provide systems and methods for generating data pipelines using natural language queries and/or describing data pipelines using natural language.

BACKGROUND

A large amount of data has become available for analysis and visualization. In some examples, data can be received or acquired from multiple sources. In certain examples, data processing is performed, such as modifying data, cleaning data, transforming data, merging data, and/or the like. In some examples, data pipelines are used for data processing.

Hence it is desirable to improve the techniques for generating data pipelines and/or generating data pipeline descriptions.

SUMMARY

Certain embodiments of the present disclosure are directed to systems and methods for generating data pipelines and/or generating descriptions of data pipelines. More particularly, some embodiments of the present disclosure provide systems and methods for generating data pipelines using natural language queries and/or describing data pipelines using natural language.

In some embodiments, a method for generating a data pipeline, the method comprising: receiving a natural language (NL) query; receiving a model result generated based on the NL query, the model result including a query in a standard query language, the model result being generated using one or more computing models; and generating the data pipeline based at least in part on the query in the standard query language, the data pipeline comprising one or more data pipeline elements, at least one data pipeline element of the one or more pipeline elements being corresponding to a query component of the query in the standard query language; wherein the method is performed using one or more processors.

In certain embodiments, a method for generating a data pipeline, the method comprising: receiving a target dataset; receiving a model result generated based on the target dataset, the model result including a query in a standard query language, the model result being generated using one or more computing models; and generating the data pipeline based at least in part on the query in the standard query language, the data pipeline comprising one or more data pipeline elements, at least one data pipeline element of the one or more pipeline elements being corresponding to a query component of the query in the standard query language; wherein the method is performed using one or more processors.

In some embodiments, a method for generating a data pipeline description, the method comprising: receiving a data pipeline, the data pipeline including one or more data pipeline elements; receiving a model result generated based on the data pipeline, the model result including a query in a standard query language, the model result being generated using one or more first computing models, a query component of the query in the standard query language being corresponding to one data pipeline element of the one or more data pipeline elements; and generating the data pipeline description based at least in part on the query in the standard query language using one or more second computing models; wherein the method is performed using one or more processors.

Depending upon embodiments, one or more benefits may be achieved. These benefits and various additional objects, features and advantages of the present disclosure can be fully appreciated with reference to the detailed description and accompanying drawings that follow.

DETAILED DESCRIPTION

Figure 1:
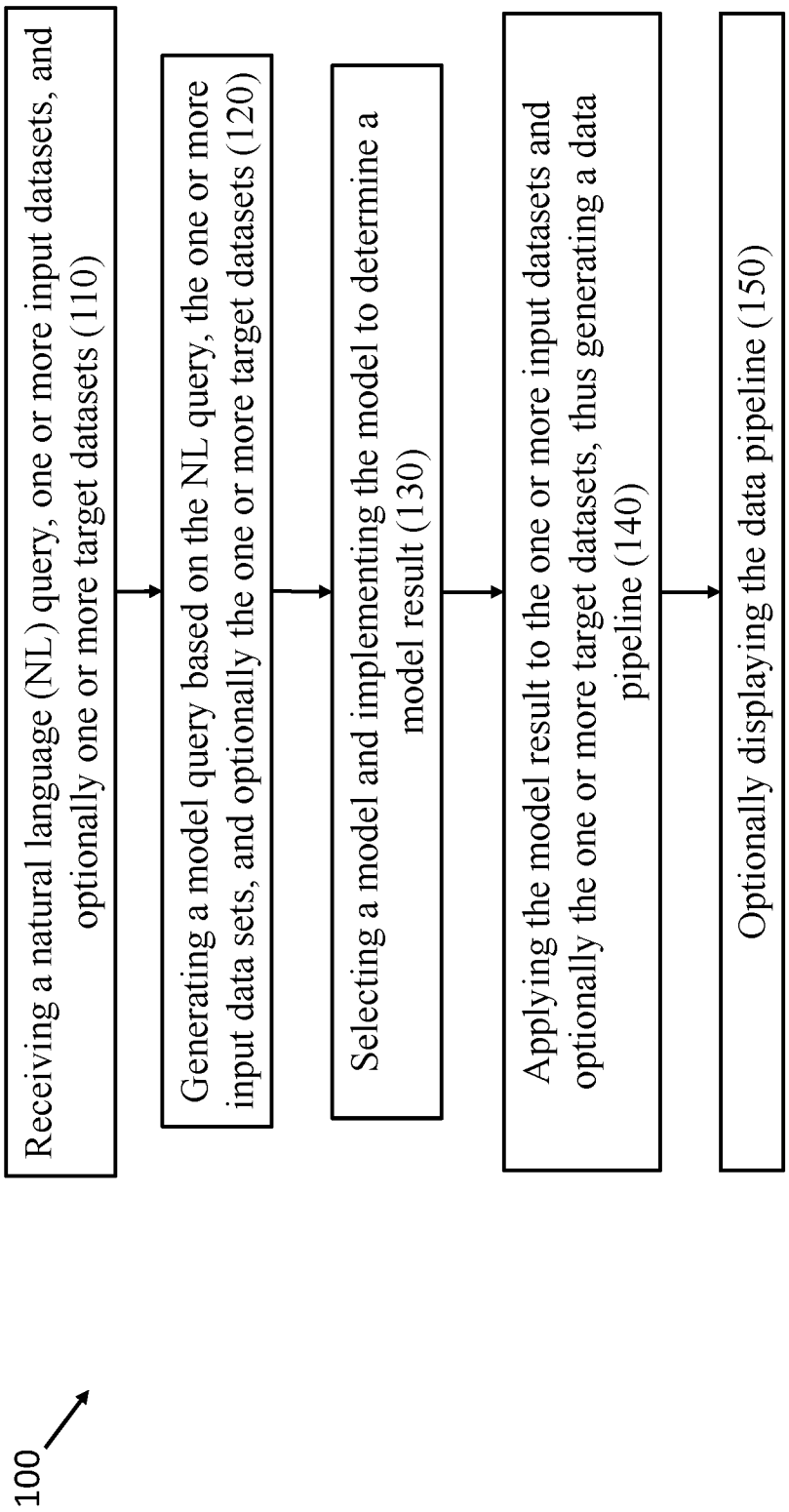
FIG. 1 is a simplified flowchart diagram showing a method for generating and optionally displaying a data pipeline according to certain embodiments of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information. As used herein, the term "receive" or "receiving" means obtaining from a data repository (e.g., database), from another system or service, from another software, or from another software component in a same software. In certain embodiments, the term "access" or "accessing" means retrieving data or information, and/or generating data or information.

The present disclosure describes, amongst other things, methods, devices, and systems that provide for generating and optionally displaying a data pipeline using a natural language (NL) query. The present disclosure also describes, amongst other things, methods, devices, and systems that provide for describing, given an input data pipeline, the input data pipeline in an NL format (e.g., via textual description). Note that reference herein to a "pipeline" refers to a data pipeline unless otherwise indicated. In some embodiments, a data pipeline includes is one or more data processing elements connected in series or in parallel. In certain embodiments, an output of one data processing element is the input of the next data processing element. In some embodiments, a plurality of data processing elements of a pipeline are executed in parallel. In certain embodiments, at least a part or all of the one or more data processing elements use a platform-specific language (e.g., a language or script language for a customized platform, platform-specific expressions). In some examples, the one or more data processing elements include, for example, selecting (e.g., filtering) a dataset, joining (e.g., aggregating) two or more datasets, selecting a set of data types (e.g., data columns), transforming data, selecting data records, removing data records (e.g., data rows), and/or the like.

In certain examples, a dataset includes one or more data types and one or more data records, where a data record includes data of the one or more data types. In some embodiments, a data pipeline includes one or more data pipeline elements. In certain embodiments, the one or more data pipeline elements may include one or more datasets, transforms, filters, joins, aggregations, or function-based modifications of data. In some embodiments, the data pipeline elements may include one or more data processing elements. In certain embodiments, the data pipeline elements include an output dataset.

FIG. 1 is a simplified flowchart diagram showing a method 100 for generating and optionally displaying a data pipeline according to certain embodiments of the present disclosure. This diagram is merely an example. One of ordinary skill in the art would recognize many variations, alternatives, and modifications. The method 100 includes processes 110, 120, 130,140, and 150 that can be performed using one or more processors. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some embodiments, some or all processes (e.g., steps) of the method 100 are performed by a system (e.g., the computing system 600). In certain examples, some or all processes (e.g., steps) of the method 100 are performed by a computer and/or a processor directed by a code. For example, a computer includes a server computer and/or a client computer (e.g., a personal computer). In some examples, some or all processes (e.g., steps) of the method 100 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

In certain embodiments, the process 110 includes receiving an NL query, one or more input datasets (e.g., including one or more tables), and optionally one or more target datasets (e.g., including one or more tables). The NL query may be a query indicating some desired information, or one or more desired datasets. The NL query may include one or more strings. The NL query may include language that indicates certain constraints on the desired data (e.g., may include language specifying a date range, or an age range). Some example NL queries may include the following:

1. What are the hospitals with the most number of critical care patients that are over age 50?
2. How many critical care patients recovered in a hospital in SEATTLE?
3. Show me the hospitals with the most critical care patients and least ICU (intensive care unit) beds.
4. What was the busiest hospital?
5. How many critical patients are aged between 14 and 50?
6. Show me the hospitals by the number of patients which have not recovered.
7. What's the hospital with the worst ratio of covid-19 doctors to critical patients?
8. Show me the number of hospitalizations per hospital per day.
9. Which offices cost the most to run?
10. What's the hardest working department?
11. What's the highest paid department per hour?
12. Which offices employed the most amount of people earning over 100k in 2021?
13. Find all employees that got a raise in 2022.
14. Which city has the highest salary?
15. Show me all employees that worked in more than one country.
16. Show me all employees that transferred from the US to the UK.
17. Which employees are among the top 1% earners in the US?

18. Departments ranked by how many days off their employees took in 2021.
19. Offices ranked by average earnings per hour of their employees.
20. Is there a gender pay gap in my company?

Note that the methods, devices, and systems described herein may be configured to respect certain privacies and/or access permissions for certain data, and thus may be configured to restrict or deny access to such data. Thus, a non-permissioned actor inputting a query regarding private or restricted data (e.g., personally identifying information, medical data, or demographic data such as gender data) may be denied a response to the query, as appropriate, thus protecting the private or restricted data.

In some embodiments, the process 120 includes generating a model query based on the NL query, the one or more input data sets, and optionally the one or more target datasets. The model query may be a query configured to be processed by a model.

In some embodiments, the process 130 may include selecting a model and implementing the model to determine a model result. The model may, but need not, be selected from a set of models based on the NL query, the one or more input data sets, and optionally the one or more target datasets. In some embodiments, the model may be a predetermined model. The model may be an NL processing model, such as a machine-learning NL processing model. For example, the model may be an autoregressive language model, such as a Generative Pre-trained Transformer 3 (GPT-3) model. Implementing the model may provide a query as an output (e.g., a structured query language (SQL) query).

In some embodiments, the process 140 may include applying the model result to the one or more input datasets and optionally the one or more target datasets, thus generating a data pipeline. Applying the model result may include parsing the SQL query and applying it to the input datasets. Applying the model result may further include converting the SQL query to a logical plan or an execution plan using an SQL manager. The SQL manager may include one or more of an SQL parser and validator, a customizable optimizer with pluggable rules and cost functions, logical and physical algebraic operators, various transformation algorithms from SQL to algebra (and the opposite), and adapters for executing SQL with various data management systems (e.g., APACHE CALCITE). Applying the model result may include convert the logical plan into expressions configured for a pipeline management system, and implementing the expressions to generate an appropriate pipeline. The pipeline may include one or more datasets, transforms, filters, joins, aggregations, or function-based modifications of data. The pipeline may include an output dataset.

In some embodiments, the process 150 may optionally include displaying the data pipeline via a GUI, such as the GUI 300 shown in FIGS. 3A and 3B and described below.

As indicated above and further emphasized here, FIG. 1 is merely an example. One of ordinary skill in the art would recognize many variations, alternatives, and modifications.

Figure 2:
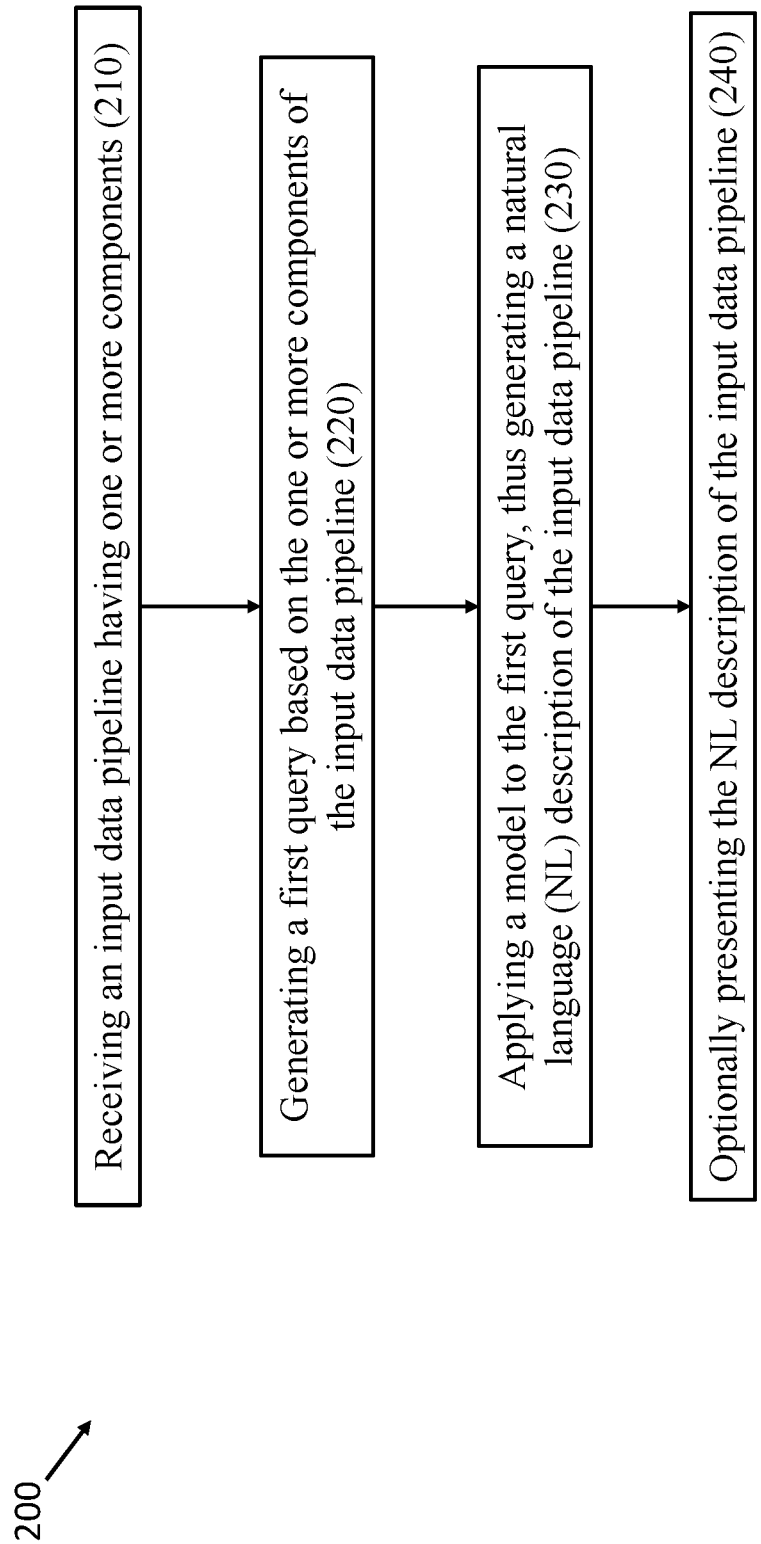
FIG. 2 is a simplified flowchart diagram showing a method for describing a data pipeline, or an output of the data pipeline, in an NL format according to certain embodiments of the present disclosure.

FIG. 2 is a simplified flowchart diagram showing a method 200 for describing a data pipeline, or an output of the data pipeline, in an NL format (e.g., via textual description or audio description) according to certain embodiments of the present disclosure. This diagram is merely an example. One of ordinary skill in the art would recognize many variations, alternatives, and modifications. The method 200 includes processes 210, 220, 230, and 240 that can be performed using one or more processors. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some embodiments, some or all processes (e.g., steps) of the method 200 are performed by a system (e.g., the computing system 600). In certain examples, some or all processes (e.g., steps) of the method 200 are performed by a computer and/or a processor directed by a code. For example, a computer includes a server computer and/or a client computer (e.g., a personal computer). In some examples, some or all processes (e.g., steps) of the method 200 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

In some embodiments, the process 210 includes receiving an input data pipeline having one or more components. The one or more components may include one or more datasets, transforms, filters, joins, aggregations, or function-based modifications of data. one or more components may include an output dataset. The input data pipeline may, in some embodiments, be a relevant or selected portion of a larger pipeline.

In some embodiments, the process 220 includes generating a first query based on the one or more components of the input data pipeline. The first query may be an SQL query. The first query may be configured to be input to a model. In some embodiments, an appropriate model is selected based on the first query; in other embodiments, the model is predetermined. The model may be an NL processing model, such as a machine-learning NL processing model. For example, the model may be an autoregressive language model, such as a GPT-3 model.

In some embodiments, the process 230 includes applying the model to the first query, thus generating a NL description of the input data pipeline. The NL description of the input data pipeline can be in any appropriate format (e.g., textual or audio). The NL description may include an explanation of one or more metrics or parameters that the pipeline can be used to determine, and may include a description of conditions defined by the pipeline. For example, one NL description may be a string that states "This pipeline is counting the number of patients who have recovered from COVID-19 and were in critical condition in Seattle", where the number of patients is a metric that the pipeline can be used to determine, and the conditions include having recovered from covid, having been in critical condition, and having been a patient in Seattle. The model may translate conditions defined in the pipeline (e.g., by referencing and translating corresponding conditions defined in the SQL query) into NL (e.g., into at least a portion of the NL description).

In some embodiments, the optional process 240 may include presenting the NL description of the input data pipeline, such as via a textual presentation in the GUI 300 shown in FIGS. 3A and 3B and described below, or via audio.

As indicated above and further emphasized here, FIG. 2 is merely an example. One of ordinary skill in the art would recognize many variations, alternatives, and modifications.

Figure 3A:
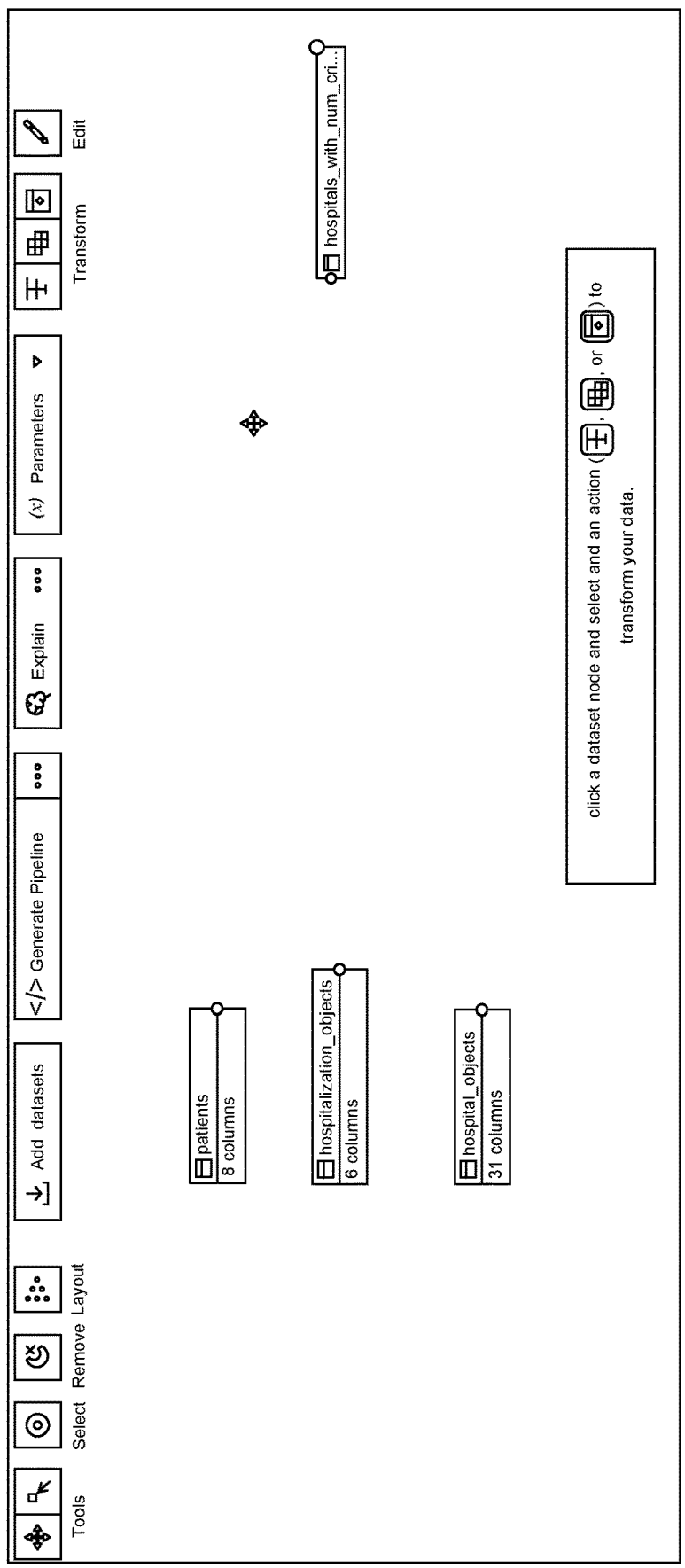
FIG. 3A displays an example of input datasets and an example target dataset displayed via a user interface.
Figure 3B:
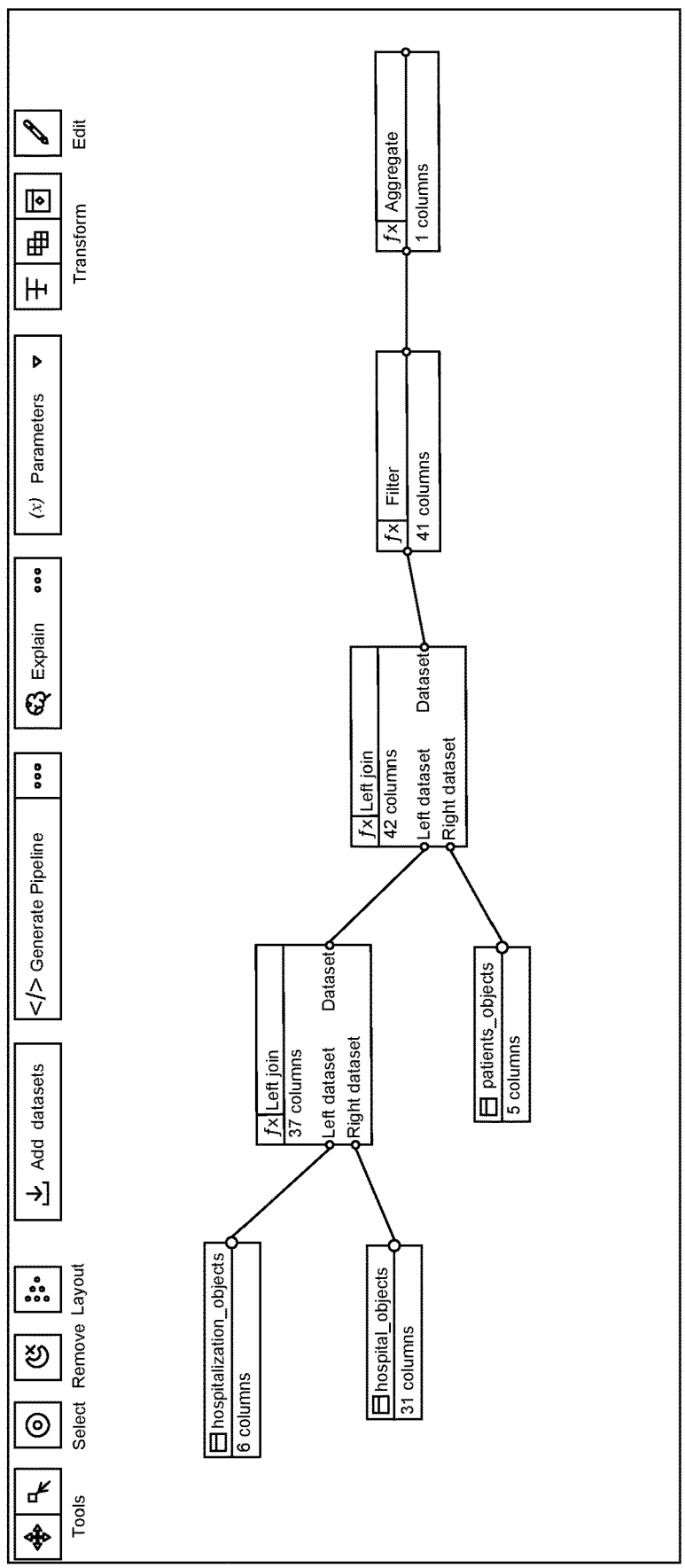
FIG. 3B shows an example of a data pipeline.

FIGS. 3A and 3B depict an example of a GUI 300, according to some embodiments. FIGS. 3A and 3B are merely examples. One of ordinary skill in the art would recognize many variations, alternatives, and modifications. In some embodiments, the computing system provides the GUI 300. The GUI 300 can be used to implement the process 100 and/or the process 200 described above.

FIG. 3A displays an example of input datasets (labeled "patients," "hospitalization objects," and "hospital objects" in the depicted image) and an example target dataset (labeled "hospitals_with_num_crit" in the depicted image) displayed via the GUI 300. The GUI 300 can provide for a user selecting the input datasets and, optionally, the target dataset, and selecting a button or other input mechanism to generate a pipeline based on those inputs. Responsive to the button or other input mechanism being activated, the GUI 300 may prompt the user to input an NL query (e.g., in textual format via a textbox, or in audio format). The computing system 600 may then use these inputs to implement process 100, thus generating a pipeline that may optionally be displayed or otherwise presented (e.g., in an audio format) by the GUI 300. FIG. 3B shows an example of such a pipeline. The depicted pipeline includes the three original input datasets, various transformations including two joins, a filter, and an aggregation, and an output dataset that matches certain parameters of the target dataset (e.g., matches the schema of the target dataset).

Figure 4:
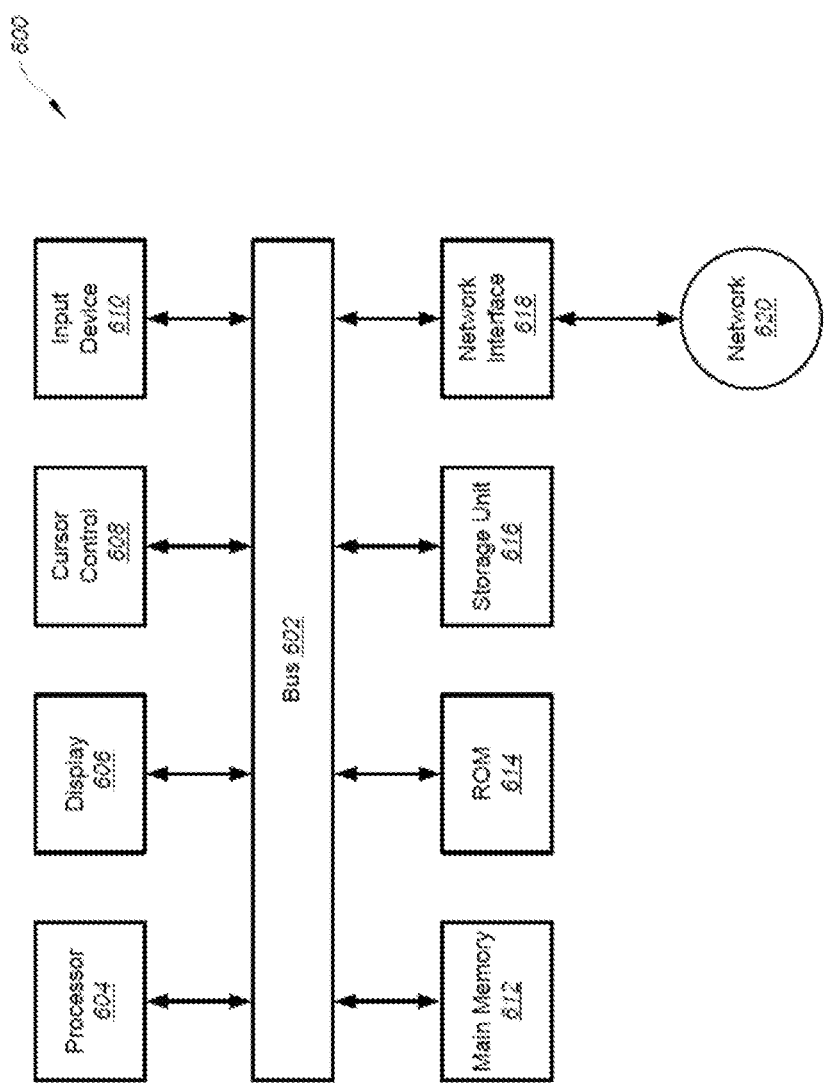
FIG. 4 is a simplified diagram showing a computing system for implementing a system for generating a data pipeline and/or generating a description for a data pipeline according to some embodiments of the present disclosure.

FIG. 4 is a simplified diagram showing a computing system for implementing a system for generating a data pipeline and/or generating a description for a data pipeline according to some embodiments of the present disclosure. This diagram is merely an example. One of ordinary skill in the art would recognize many variations, alternatives, and modifications. The computing system 600 includes a bus 602 or other communication mechanism for communicating information, a processor 604, a display 606, a cursor control component 608, an input device 610, a main memory 612, a read only memory (ROM) 614, a storage unit 616, and a network interface 618. In certain embodiments, some or all processes (e.g., steps) of the methods 100, 200, 500, and/or 600 are performed by the computing system 600. In some examples, the bus 602 is coupled to the processor 604, the display 606, the cursor control component 606, the input device 610, the main memory 612, the read only memory (ROM) 614, the storage unit 616, and/or the network interface 618. In certain examples, the network interface is coupled to a network 620. For example, the processor 604 includes one or more general purpose microprocessors. In some examples, the main memory 612 (e.g., random access memory (RAM), cache and/or other dynamic storage devices) is configured to store information and instructions to be executed by the processor 604. In certain examples, the main memory 612 is configured to store temporary variables or other intermediate information during execution of instructions to be executed by processor 604. For examples, the instructions, when stored in the storage unit 616 accessible to processor 604, render the computing system 600 into a special-purpose machine that is customized to perform the operations specified in the instructions. In some examples, the ROM 614 is configured to store static information and instructions for the processor 604. In certain examples, the storage unit 616 (e.g., a magnetic disk, optical disk, or flash drive) is configured to store information and instructions.

In some embodiments, the display 606 (e.g., a cathode ray tube (CRT), an LCD display, or a touch screen) is configured to display information to a user of the computing system 600. In some examples, the input device 610 (e.g., alphanumeric and other keys) is configured to communicate information and commands to the processor 604. For example, the cursor control 608 (e.g., a mouse, a trackball, or cursor direction keys) is configured to communicate additional information and commands (e.g., to control cursor movements on the display 606) to the processor 604.

Figure 5:
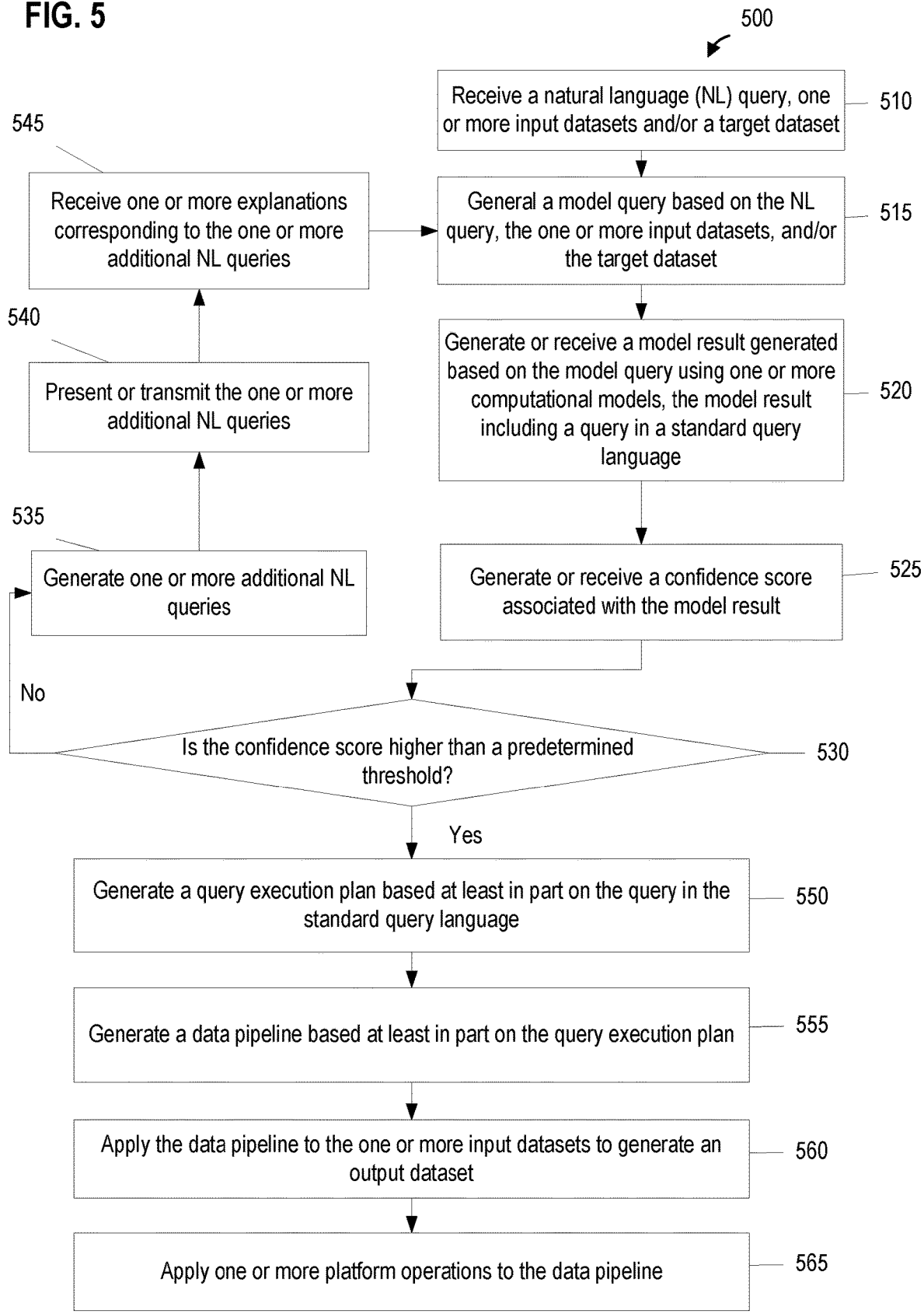
FIG. 5 is a simplified diagram showing a method for generating a data pipeline according to certain embodiments of the present disclosure.

FIG. 5 is a simplified diagram showing a method 500 for generating a data pipeline according to certain embodiments of the present disclosure. This diagram is merely an example. One of ordinary skill in the art would recognize many variations, alternatives, and modifications. The method 500 for generating a data pipeline includes processes 510, 515, 520, 525, 530, 535, 540, 545, 550, 555, 560, and 565. Although the above has been shown using a selected group of processes for the method 500 for generating a data pipeline, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

In some embodiments, some or all processes (e.g., steps) of the method 500 are performed by a system (e.g., the computing system 600 illustrated in FIG. 4). In certain examples, some or all processes (e.g., steps) of the method 500 are performed by a computer and/or a processor directed by a code. For example, a computer includes a server computer and/or a client computer (e.g., a personal computer). In some examples, some or all processes (e.g., steps) of the method 500 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, at process 510, the computing system (e.g., a pipeline management system, components of a pipeline management system) is configured to receive an NL query (e.g., free-text query, a pipeline description), one or more input datasets, and/or a target dataset (e.g., one or more target datasets) from a user input or an input via a software interface. In some embodiments, a software interface includes an application programming interface (API), a web service interface, retrieving information from a file, retrieving information from a data repository, and/or the like. In certain embodiments, the computing system can generate a model query by combining the NL query with the one or more input datasets and/or the one or more datasets. As an example, an NL query is a free-text query that the user enters via a user interface, such as, "List one person who has earned less than the US minimum wage in 2020." In some embodiments, each of the one or more input datasets include a data schema (e.g., an employee table, a department table, a payment table) and data. In certain embodiments, a user can select input datasets via a user interface. For example, a user can select the datasets (e.g., highlighted datasets) on a user interface.

In some embodiments, one or more target datasets can be defined based a user input or an input via a software interface. In some embodiments, a target dataset can include one or more target data types (e.g., data columns, data fields). In certain embodiments, a user can define the one or more target datasets via a user interface.

According to certain embodiments, at process 515, the computing system can generate a model query based on the NL query, the one or more input datasets, and/or the target dataset. In some embodiments, the model query includes the NL query and the one or more input datasets. In certain embodiments, the model query includes the NL query and the target dataset. In some embodiments, the model query includes the NL query. In certain embodiments, the model query includes the target dataset. In some embodiments, the model query includes the one or more input datasets and the target dataset. In certain embodiments, the computing system can use the target dataset to define the query. In some embodiments, the computing system can incorporate one or more parameters and parameter values and/or parameter ranges to the model query. In certain embodiments, the computing system can incorporate one or more parameters and parameter values and/or parameter ranges to the model query to ensure the query generated in the following step is valid. For example, the computing system can incorporate a temperature parameter, and can set the temperature to be greater than zero.

According to some embodiments, at process 520, the computing system generates or receives a model result generated based on the model query using one or more computing models. In certain embodiments, the computing system processes the model query using one or more computing models (e.g., a natural language processing model, a model solution) to generate a query (e.g., a model result) in a standard query language (e.g., SQL). In certain embodiments, the computing system transmits, via a software interface, the model query to a model solution (e.g., OpenAI) including one or more computing models for processing, and receives the model result (e.g., the query in the standard query language). In some embodiments, a model, also referred to as a computing model, includes a model to process data. In certain embodiments, a model includes, for example, an artificial intelligence (AI) model, a machine learning (ML) model, a deep learning (DL) model, an image processing model, an algorithm, a rule, other computing models, and/or a combination thereof. In some embodiments, the one or more computing models include a natural language processing model. In certain embodiments, the model may include a machine-learning NL processing model. For example, the model may include an autoregressive language model, such as a Generative Pre-trained Transformer 3 (GPT-3) model. As an example, the model may include a natural language understanding model.

In some embodiments, the one or more computing models are selected based on a user input or an input via a software interface. In certain embodiments, the model solution can be a part of the computing system. In some embodiments, the model solution can run externally from the computing system. In certain embodiments, the model solution selects the one or more computing models based on the model query.

In certain embodiments, the computing system is configured to make sure data pipelines are accurate. In some embodiments, the computing system interacts with the model solution to figure out if, given the NL query, the model solution has the right level of understanding of the concepts in the NL query. If not, the model solution, via the computing system, prompt the user for an explanation, and the computing system can feed the explanation back to the model to ensure the most accurate pipeline is generated. In certain embodiments, the computing system can tie the explanation back to the datasets (e.g., the input datasets, the target dataset), to make sure that that the explanation (e.g., context) is stored for the pipelining attempts.

According to certain embodiments, at process 525, the computing system, via the model solution can generate or receive a confidence score associated with the model result (e.g., the query in the standard query language). In some embodiments, the confidence score indicates whether information (e.g., concept explanation) is missing. In certain embodiments, the confidence score is one of one or more metrics being used. In some embodiments, the confidence score can be replaced by one or more other metrics. In certain embodiments, the computing system and/or the model solution determines the confidence score based on one or more concepts extracted from the model query. In some embodiments, the computing system and/or the model solution determines the confidence score based on one or more concepts extracted from the model query and the one or more input datasets. In certain embodiments, the computing system and/or the model solution is set to a low value (e.g., a low level) if a concept extracted from the model query does not correspond to the one or more input datasets. For example, the NL query is "List all employees who make made more money than the CTO in 2020", the model solution determines that CTO is unknown, and the confidence score is set to a low value (e.g., a low level).

According to some embodiments, at process 530, the computing system can determine whether the confidence score associated with the model result and/or the query in the standard language is higher than a predetermined threshold. In certain embodiments, if the confidence score is lower than a predetermined threshold, at process 535, the computing system and/or the model solution can generate one or more additional NL queries. In the previous example, the additional NL query of "Who is the CTO?" can be generated.

According to certain embodiments, at process 540, the computing system presents or transmits (e.g., to another computing device) the one or more additional NL queries. In some embodiments, at process 545, the computing system receives one or more explanations corresponding to the one or more additional NL queries. In certain embodiments, at process 515, the computing system can incorporate the one or more explanations to the model query. In some embodiments, the computing system can incorporate the one or more explanations into the one or more input datasets and/or the target dataset. In the previous example, the computing system may receive an explanation of "CTO is Joe Doe" and incorporate it to the model query.

According to some embodiments, the computing system may receive or generate the model result including an SQL query, and optionally a confidence score. In the previous example, the generated SQL query can be:

SELECT first_name, last_name, salary_payment_in_us_dollars
FROM Employees
JOIN Payments ON Employees.employee_id=Payments.employee_id
WHERE salary_payment_in_us_dollars >(SELECT salary_payment_in_us_dollars
FROM Employees
JOIN Payments ON Employees.employee_id=Payments.employee_id WHERE first_name='John' AND last_name='Doe' AND payment_year=2020)

As an example, a user (e.g., a domain expert) may ask "What is the rate of upload for agents?" In some embodiments, the model solution can identify there is a missing concept, for example, the concept of "rate of upload," in the data schema (e.g., data schema of the input datasets, data schema of the output datasets). In certain examples, the computing system can generate clarification questions corresponding to the missing concept (e.g., underspecified fragments given schemas), for example, "What do you mean by rate of upload?" In some examples, the clarification questions can be posted to the user, and in response to the clarification questions, the computing system may receive one or more explanations corresponding to the clarification questions. In certain examples, the computing system can incorporate the explanations to the model query for generating the model result, for example, to get an accurate pipeline for the original NL query.

According to some embodiments, the computing system can receive an NL query (e.g., a question) that is under specified. For example, the question includes concepts (e.g., concepts used by users) that does not match to data schemas (e.g., the data model). For example, some of the data types (e.g., data columns) don't reflect the same language that a user is using. In certain embodiments, instead of trying to take a guess, the computing system and/or the model solution can set low confidence, or other metric, on the NL query. In some embodiments, the computing system and/or the model solution can compile clarification questions, for example, "what do you mean by certain term" where the certain term corresponds to a missing concept (e.g., an unmatched column). In certain embodiments, this approach allows filling in the gap of the information that the model is missing. In some embodiments, the computing system can take all the information (e.g., NL query, one or more explanations), and re-run the one or more computing models (e.g., via the model solution), such that the generated model result has high confidence. In certain examples, the NL query includes a term that is mentioned in any column (e.g., data types).

According to certain embodiments, at process 550, the computing system can generate a query execution plan based at least in part on the query in the standard query language. In some embodiments, the query execution plan includes an order (e.g., a sequence, a tree structure) for a plurality of query operations to be applied to data (e.g., data repository). In certain embodiments, the query execution plan includes a logical plan and/or a physical plan. In some embodiments, a logical plan includes a plurality of logical operators applying to data and an order of the logical operators being applied. In certain embodiments, a physical plan includes physical implementation information of a query plan. In certain embodiments, the computing system can use a query manager (e.g., a SQL manager) to generate the query execution plan. In some embodiments, the query manager includes a query validator to validate the generated query in the standard query language. In some embodiments, the query manager can use a software package (e.g., APACHE CALCITE).

According to some embodiments, at process 555, the computing system can generate a data pipeline based at least in part on the query execution plan and/or the model result. In certain embodiments, the data pipeline includes one or more data pipeline elements. In some embodiments, the one or more data pipeline elements include one or more datasets, filters, joins, aggregations, and/or function-based modifications of data. In certain embodiments, the one or more data pipeline elements include one or more datasets and one or more data processing elements. In some embodiments, the one or more datasets include one or more input datasets and/or one or more output datasets. In some embodiments, the one or more data processing elements include filters, joins, aggregations, and/or function-based modifications of data.

According to certain embodiments, the computing system can map one or more query components of the query in the standard query language to one or more pipeline elements. In some embodiments, the computing system can map one or more query components of the query in the standard query language, using the query execution plan to one or more pipeline elements. In certain embodiments, the one or more query components includes one or more data queries (e.g., select statements, etc.), data manipulations (e.g., inserts, updates, deletes, etc.), data definitions (e.g., schema creations, schema modifications, etc.), data access controls, and/or the like.

In certain embodiments, the data pipeline in one or more platform-specific expressions of a first platform (e.g., a domain). In certain embodiments, the computing system can convert the query execution plan (e.g., a logical plan, a physical plan) into platform-specific expressions to generate the data pipeline. In some embodiments, the platform-specific expressions can include scripts. In certain embodiments, the platform-specific expressions are associated with a proprietary platform (e.g., a customized platform). In certain embodiments, the query execution plan includes a plurality of query steps, and the data pipeline includes a plurality of data pipeline elements (e.g., pipeline steps) corresponding to the plurality of query steps. In some embodiments, a plurality of pipeline steps are corresponding to the plurality of query steps in one-to-one relationship. In certain embodiments, the target dataset can be converted into a target object, and the generated data pipeline is associated with the target object, for example, in a semantic layer, which can be reused. In some embodiments, the generated data pipeline is captured in an object.

According to certain embodiments, at process 560, the computing system can apply the data pipeline to the one or more input datasets to generate an output dataset. In some embodiments, if a target dataset is provided, the output dataset has the same data schema as the target dataset. In some embodiments, at process 565, the computing system can apply one or more platform operations of a platform (e.g., a proprietary platform) to the data pipeline. For example, the one or more platform operations include one or more of search, security, branching, data health check, data health contract, visualizations. In certain embodiments, the data pipeline object and/or the target object can be used in actions and decisions. In some embodiments, an action refers to one or more processing logics applied to one or more objects including, for example, creating objects, changing objects, combining objects, linking objects, deleting objects, and/or the like.

Figure 6:
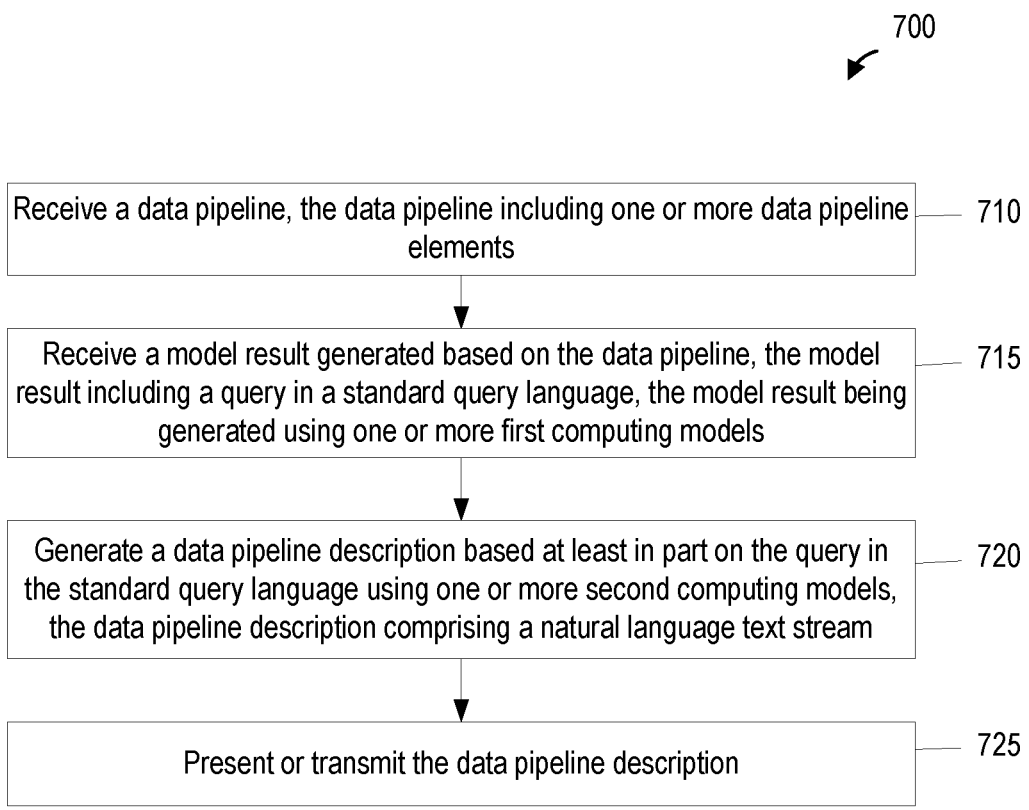
FIG. 6 is a simplified diagram showing a method for generating a data pipeline description according to certain embodiments of the present disclosure.

FIG. 6 is a simplified diagram showing a method 700 for generating a data pipeline description according to certain embodiments of the present disclosure. This diagram is merely an example. One of ordinary skill in the art would recognize many variations, alternatives, and modifications. The method 700 for generating a data pipeline description includes processes 710, 715, 720, and 725. Although the above has been shown using a selected group of processes for the method 700 for generating a data pipeline description, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

In some embodiments, some or all processes (e.g., steps) of the method 700 are performed by a system (e.g., the computing system 600 illustrated in FIG. 4). In certain examples, some or all processes (e.g., steps) of the method 700 are performed by a computer and/or a processor directed by a code. For example, a computer includes a server computer and/or a client computer (e.g., a personal computer). In some examples, some or all processes (e.g., steps) of the method 700 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to certain embodiments, at process 710, the computing system receives a data pipeline, the data pipeline including one or more data pipeline elements. In some embodiments, the one or more data pipeline elements include one or more datasets, filters, joins, aggregations, and/or function-based modifications of data. In certain embodiments, the one or more data pipeline elements include one or more datasets and one or more data processing elements. In some embodiments, the one or more datasets includes one or more input datasets and/or one or more output datasets. In certain embodiments, the one or more data processing elements include filters, joins, aggregations, and/or function-based modifications of data. In some embodiments, the data pipeline uses one or more platform-specific expressions associated with a platform. In certain embodiments, the computing system maps one or more query components of the query in the standard query language to one or more data pipeline elements.

In some embodiments, at process 715, the computing system receives a model result generated based on the data pipeline, the model result including a query in a standard query language, where the model result is generated using one or more first computing models. In certain embodiments, the computing system transmits, via a software interface, the data pipeline to a model solution (e.g., OpenAI) including one or more first computing models for processing. In certain embodiments, the computing system provides or uses one or more parameters to the one or more first computing models to generate the query in a standard query language.

According to some embodiments, at process 720, the computing system generates a data pipeline description (e.g., an NL description) based at least in part on the query in the standard query language using one or more second computing models, where the data pipeline description comprises a natural language (NL) text stream. In certain embodiments, the second computing models are in the model solution. In some embodiments, the one or more second computing models include a natural language processing model. In certain embodiments, the model may include a machine-learning NL processing model. For example, the model may include an autoregressive language model, such as a Generative Pre-trained Transformer 3 (GPT-3) model. As an example, the model may include a natural language understanding model. In some embodiments, the NL description is generated using a regular expression and the data schema identified in the query in the standard query language. In certain embodiments, the computing system and/or the model solution is configured to incorporate one or more parameters in the data pipeline into the NL description. For example, the data pipeline description is "It is joining the Departments table with the Employees table and the Payments table."

According to certain embodiments, at process 725, the computing system presents or transmits (e.g., via a software interface) the data pipeline description. In some embodiments, the computing system can present the data pipeline description on a user interface. In certain embodiments, the computing system can transmit the data pipeline description to a computing solution via a software interface (e.g., API, a web service).

Figure 7:
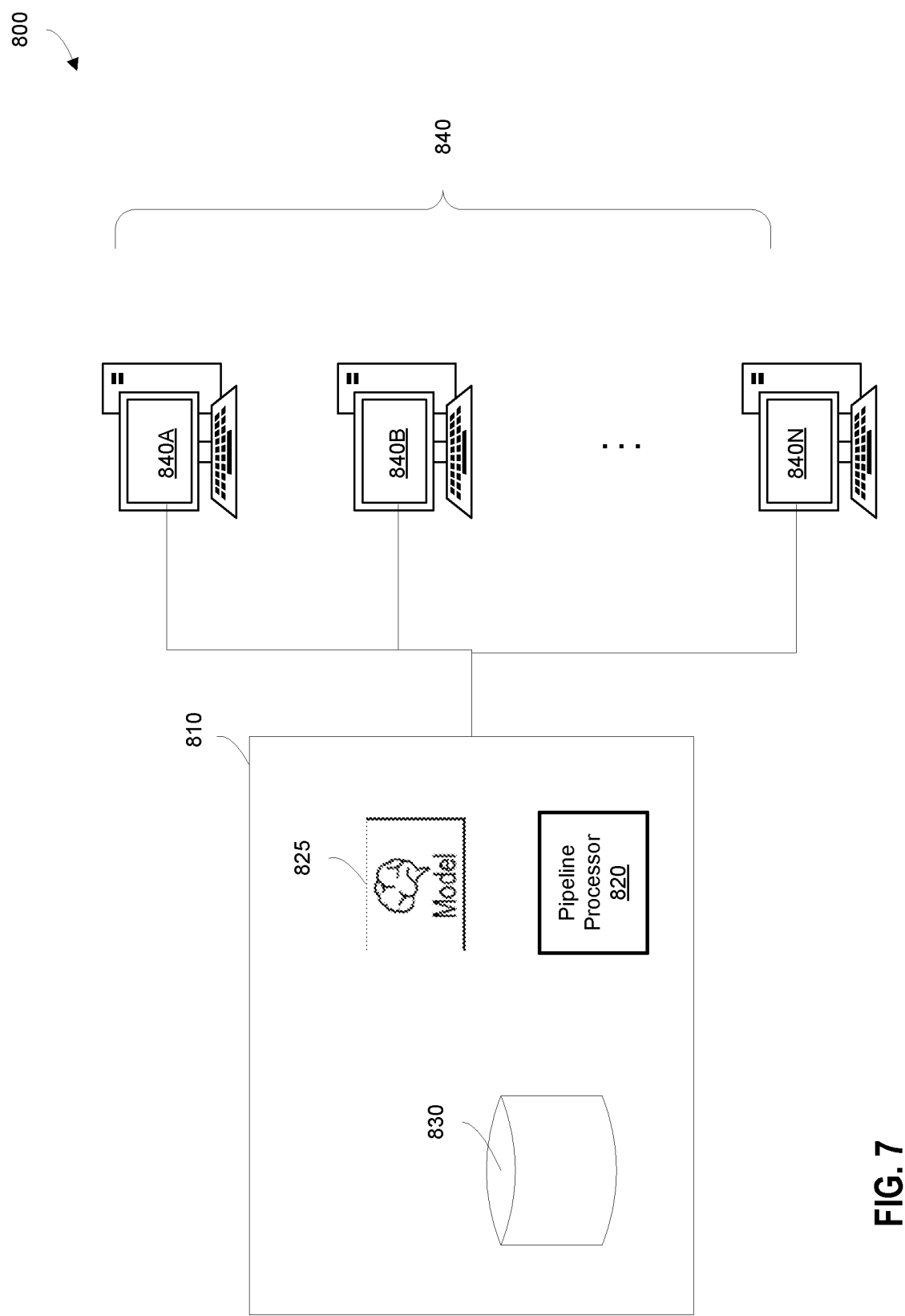
FIG. 7 is an illustrative example of a data pipeline management environment, according to certain embodiments of the present disclosure.

FIG. 7 is an illustrative example of a data pipeline management environment 800, according to certain embodiments of the present disclosure. FIG. 7 is merely an example. One of the ordinary skilled in the art would recognize many variations, alternatives, and modifications. According to certain embodiments, the data pipeline management environment 800 includes a pipeline management system 810 and one or more user devices or third-party devices 840 (e.g., a user/third-party device 840A, a user/third-party device 840B, . . . a user/third-party device 840N). In some embodiments, the pipeline management system 810 includes one or more pipeline processors 820, a model processor 825, and one or more storage repositories 830. In certain embodiments, one or more components of the pipeline management system 810 are incorporated into the one or more user/third-party devices 840. Although the above has been shown using a selected group of components in the data pipeline management environment 800, there can be many alternatives, modifications, and variations. For example, some of the components may be expanded and/or combined. Other components may be inserted into those noted above. Depending upon the embodiment, the arrangement of components may be interchanged with others replaced. Further details of these components are found throughout the present disclosure.

According to some embodiments, the pipeline management system 810 and/or the pipeline processor 820 is configured to receive an NL query (e.g., free-text query, a pipeline description), one or more input datasets, and/or a target dataset (e.g., one or more target datasets) from a user input or an input via a software interface. In certain examples, the user input is from a user device 840 of a user. In some examples, the input is from a computing solution running on one or more user/third-party devices 840. In certain embodiments, the pipeline management system 810 and/or the pipeline processor 820 can generate a model query by combining the NL query with the one or more input datasets and/or the one or more datasets. As an example, an NL query is a free-text query that the user enters via a user interface, such as, "List one person who has earned less than the US minimum wage in 2020." In some embodiments, each of the one or more input datasets include a data schema (e.g., an employee table, a department table, a payment table) and data. In certain embodiments, a user can select input datasets via a user interface. For example, a user can select the datasets (e.g., highlighted datasets) on a user interface.

In some embodiments, one or more target datasets can be defined based on a user input or an input via a software interface. In some embodiments, a target dataset can include one or more target data types (e.g., data columns, data fields). In certain embodiments, a user can define the one or more target datasets via a user interface.

According to certain embodiments, the pipeline management system 810 and/or the pipeline processor 820 can generate a model query based on the NL query, the one or more input datasets, and/or the target dataset. In some embodiments, the model query includes the NL query and the one or more input datasets. In certain embodiments, the model query includes the NL query and the target dataset. In some embodiments, the model query includes the NL query. In certain embodiments, the model query includes the target dataset. In some embodiments, the model query includes the one or more input datasets and the target dataset. In certain embodiments, the pipeline management system 810 and/or the pipeline processor 820 can use the target dataset to define the query. In some embodiments, the pipeline management system 810 and/or the pipeline processor 820 can incorporate one or more parameters and parameter values and/or parameter ranges to the model query. In certain embodiments, the pipeline management system 810 and/or the pipeline processor 820 can incorporate one or more parameters and parameter values and/or parameter ranges to the model query to ensure the query generated in the following step is valid. For example, the pipeline management system 810 and/or the pipeline processor 820 can incorporate a temperature parameter, and can set the temperature to be greater than zero.

According to some embodiments, the pipeline management system 810 and/or the model processor 825 generates or receives a model result generated based on the model query using one or more computing models. In certain embodiments, the pipeline management system 810 and/or the model processor 825 processes the model query using one or more computing models (e.g., a natural language processing model, a model solution) to generate a query (e.g., a model result) in a standard query language (e.g., SQL). In certain embodiments, the pipeline management system 810 and/or the model processor 825 transmits, via a software interface, the model query to a model solution (e.g., OpenAI) including one or more computing models for processing, and receives the model result (e.g., the query in the standard query language). In some embodiments, the one or more computing models include a natural language processing model. In certain embodiments, the model may include a machine-learning NL processing model. For example, the model may include an autoregressive language model, such as a Generative Pre-trained Transformer 3 (GPT-3) model. As an example, the model may include a natural language understanding model.

In some embodiments, the one or more computing models are selected based on a user input or an input via a software interface. In certain embodiments, the model solution can be a part of the pipeline management system 810 and/or the model processor 825. In some embodiments, the model solution can run externally from the pipeline management system 810 and/or the pipeline processor 820. In certain embodiments, the model solution selects the one or more computing models based on the model query.

In certain embodiments, the pipeline management system 810 and/or the pipeline processor 820 is configured to make sure data pipelines are accurate. In some embodiments, the pipeline management system 810 and/or the pipeline processor 820 interacts with the model solution to figure out if, given the NL query, the model solution has the right level of understanding of the concepts in the NL query. If not, the model solution, via the pipeline management system 810 and/or the pipeline processor 820, prompt the user for an explanation, and the pipeline management system 810 and/or the pipeline processor 820 can feed the explanation back to the model to ensure the most accurate pipeline is generated. In certain embodiments, the pipeline management system 810 and/or the pipeline processor 820 can tie the explanation back to the datasets (e.g., the input datasets, the target dataset), to make sure that that the explanation (e.g., context) is stored for the pipelining attempts.

According to certain embodiments, the pipeline management system 810 and/or the pipeline processor 820, via the model solution can generate or receive a confidence score associated with the model result (e.g., the query in the standard query language). In some embodiments, the confidence score indicates whether information (e.g., concept explanation) is missing. In certain embodiments, the confidence score is one of one or more metrics being used. In some embodiments, the confidence score can be replaced by one or more other metrics. In certain embodiments, the pipeline management system 810 and/or the pipeline processor 820 and/or the model solution determines the confidence score based on one or more concepts extracted from the model query. In some embodiments, the pipeline management system 810 and/or the model processor 825 determines the confidence score based on one or more concepts extracted from the model query and the one or more input datasets. In certain embodiments, the pipeline management system 810 and/or the model processor 825 is set to a low value (e.g., a low level) if a concept extracted from the model query does not correspond to the one or more input datasets.

According to some embodiments, the pipeline management system 810 and/or the pipeline processor 820 can determine whether the confidence score associated with the model result and/or the query in the standard language is higher than a predetermined threshold. In certain embodiments, if the confidence score is lower than a predetermined threshold, the pipeline management system 810 and/or the model processor 825 can generate one or more additional NL queries.

According to certain embodiments, the pipeline management system 810 and/or the pipeline processor 820 presents (e.g., on a user device 840) or transmits (e.g., to one or more user/third-party devices 840) the one or more additional NL queries. In some embodiments, the pipeline management system 810 and/or the pipeline processor 820 receives one or more explanations correspond to the one or more additional NL queries. In certain embodiments, the pipeline management system 810 and/or the pipeline processor 820 can incorporate the one or more explanations into the model query. In some embodiments, the pipeline management system 810 and/or the pipeline processor 820 can incorporate the one or more explanations into the one or more input datasets and/or the target dataset.

According to some embodiments, the pipeline management system 810 and/or the pipeline processor 820 can receive an NL query (e.g., a question) that is underspecified. For example, the question includes concepts (e.g., concepts used by users) that does not match to data schemas (e.g., the data model). For example, some of the data types (e.g., data columns) don't reflect the same language that a user is using. In certain embodiments, instead of trying to take a guess, the pipeline management system 810 and/or the pipeline processor 820 and/or the model solution can set low confidence, or another metric, on the NL query. In some embodiments, the pipeline management system 810 and/or the pipeline processor 820 and/or the model solution can compile clarification questions, for example, "what do you mean by certain term" where the certain term corresponds to a missing concept (e.g., an unmatched column). In certain embodiments, this approach allows filling in the gap of the information that the model is missing. In some embodiments, the pipeline management system 810 and/or the pipeline processor 820 can take all the information (e.g., NL query, one or more explanations), and re-run the one or more computing models (e.g., via the model solution), such that the generated model result has high confidence. In certain examples, the NL query includes a term that is mentioned in any column (e.g., data types).

According to certain embodiments, the pipeline management system 810 and/or the pipeline processor 820 can generate a query execution plan based at least in part on the query in the standard query language. In some embodiments, the query execution plan includes an order (e.g., a sequence, a tree structure) for a plurality of query operations to be applied to data (e.g., data repository). In certain embodiments, the query execution plan includes a logical plan and/or a physical plan. In some embodiments, a logical plan includes a plurality of logical operators applying to data and an order of the logical operators being applied. In certain embodiments, a physical plan includes physical implementation information of a query plan. In certain embodiments, the pipeline management system 810 and/or the pipeline processor 820 can use a query manager (e.g., a SQL manager) to generate the query execution plan. In some embodiments, the query manager includes a query validator to validate the generated query in the standard query language. In some embodiments, the query manager can use a software package (e.g., APACHE CALCITE).

According to some embodiments, the pipeline management system 810 and/or the pipeline processor 820 can generate a data pipeline based at least in part on the query execution plan. In certain embodiments, the data pipeline includes one or more data pipeline elements. In some embodiments, the one or more data pipeline elements include one or more datasets, filters, joins, aggregations, and/or function-based modifications of data. In certain embodiments, the one or more data pipeline elements include one or more datasets and one or more data processing elements. In some embodiments, the one or more datasets include one or more input datasets and/or one or more output datasets. In some embodiments, the one or more data processing elements include filters, joins, aggregations, and/or function-based modifications of data.

According to certain embodiments, the pipeline management system 810 and/or the pipeline processor 820 can map one or more query components of the query in the standard query language to one or more pipeline elements. In some embodiments, the pipeline management system 810 and/or the pipeline processor 820 can map, using the query execution plan, one or more query components of the query in the standard query language to one or more pipeline elements. In certain embodiments, the one or more query components include one or more data queries (e.g., select statements, etc.), data manipulations (e.g., inserts, updates, deletes, etc.), data definitions (e.g., schema creations, schema modifications, etc.), data access controls, and/or the like.

In certain embodiments, the data pipeline is in one or more platform-specific expressions of a first platform (e.g., a domain). In certain embodiments, the computing system can convert the query execution plan (e.g., a logical plan, a physical plan) into platform-specific expressions to generate the data pipeline. In some embodiments, the platform-specific expressions can include scripts. In certain embodiments, the platform-specific expressions are associated with a proprietary platform (e.g., a customized platform). In certain embodiments, the query execution plan includes a plurality of query steps, and the data pipeline includes a plurality of data pipeline elements (e.g., pipeline steps) corresponding to the plurality of query steps. In some embodiments, a plurality of pipeline steps are corresponding to the plurality of query steps in one-to-one relationship. In certain embodiments, the target dataset can be converted into a target object, and the generated data pipeline is associated with the target object, for example, in a semantic layer, which can be reused. In some embodiments, the generated data pipeline is captured in an object.

According to certain embodiments, the pipeline management system 810 and/or the pipeline processor 820 can apply the data pipeline to the one or more input datasets to generate an output dataset. In some embodiments, if a target dataset is provided, the output dataset has a same data schema as the target dataset. In some embodiments, the pipeline management system 810 and/or the pipeline processor 820 can apply one or more platform operations of a proprietary platform to the data pipeline. For example, the one or more platform operations include one or more of search, security, branching, data health check, data health contract, visualizations, and/or the like. In certain embodiments, the data pipeline object and/or the target object can be used in actions and decisions. In some embodiments, an action refers to one or more processing logics applied to one or more objects including, for example, creating objects, changing objects, combining objects, linking objects, deleting objects, and/or the like.

According to certain embodiments, the pipeline management system 810 and/or the pipeline processor 820 receives a data pipeline, where the data pipeline includes one or more data pipeline elements. In some embodiments, the one or more data pipeline elements include one or more datasets, filters, joins, aggregations, and/or function-based modifications of data. In certain embodiments, the data pipeline uses one or more platform-specific expressions associated with a platform. In some embodiments, the pipeline management system 810 and/or the pipeline processor 820 receives a model result generated based on the data pipeline, the model result including a query in a standard query language, where the model result is generated using one or more first computing models. In certain embodiments, the pipeline management system 810 and/or the model processor 825 transmits, via a software interface, the data pipeline to a model solution (e.g., OpenAI) including one or more first computing models for processing. In certain embodiments, the pipeline management system 810 and/or the model processor 825 provides or uses one or more parameters to the one or more first computing models to generate the query in a standard query language. In certain embodiments, the pipeline management system 810 and/or the model processor 825 maps one or more query components of the query in the standard query language to one or more data pipeline elements.

According to some embodiments, the pipeline management system 810 and/or the model processor 825 generates a data pipeline description (e.g., an NL description) based at least in part on the query in the standard query language using one or more second computing models, where the data pipeline description comprises a natural language (NL) text stream. In certain embodiments, the second computing models are in the model solution. In some embodiments, the one or more second computing models include a natural language processing model. In certain embodiments, the model may include a machine-learning NL processing model. For example, the model may include an autoregressive language model, such as a Generative Pre-trained Transformer 3 (GPT-3) model. As an example, the model may include a natural language understanding model. In some embodiments, the NL description is generated using a regular expression and the data schema identified in the query in the standard query language. In certain embodiments, the pipeline management system 810 and/or the pipeline processor 820 and/or the model solution is configured to incorporate one or more parameters in the data pipeline into the NL description.

According to certain embodiments, the pipeline management system 810 and/or the pipeline processor 820 presents or transmits (e.g., via a software interface) the data pipeline description. In some embodiments, the pipeline management system 810 and/or the pipeline processor 820 can present the data pipeline description on a user interface. In certain embodiments, the pipeline management system 810 and/or the pipeline processor 820 can transmit the data pipeline description to a computing solution (e.g., a computing solution running on one or more user/third-party devices 840) via a software interface (e.g., API, a web service).

In some embodiments, the data repository 830 can include NL queries, queries in a standard query language, data pipelines, query execution plans, data pipeline descriptions, and/or the like. The repository 830 may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components in the data pipeline management environment 800 can execute software or firmware stored in non-transitory computer-readable medium to implement various processing steps. Various components and processors of the data pipeline management environment 800 can be implemented by one or more computing devices including, but not limited to, circuits, a computer, a cloud-based processing unit, a processor, a processing unit, a microprocessor, a mobile computing device, and/or a tablet computer. In some cases, various components of the data pipeline management environment 800 (e.g., the pipeline management system 810, the pipeline processor 820, the model processor 825, the user/third-party device 840) can be implemented on a shared computing device. Alternatively, a component of the data pipeline management environment 800 can be implemented on multiple computing devices. In some implementations, various modules and components of the data pipeline management environment 800 can be implemented as software, hardware, firmware, or a combination thereof. In some cases, various components of the data pipeline management environment 800 can be implemented in software or firmware executed by a computing device.

Various components of the data pipeline management environment 800 can communicate via or be coupled to via a communication interface, for example, a wired or wireless interface. The communication interface includes, but is not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

According to certain embodiments, a method for generating a data pipeline, the method comprising: receiving a natural language (NL) query; receiving a model result generated based on the NL query, the model result including a query in a standard query language, the model result being generated using one or more computing models; and generating the data pipeline based at least in part on the query in the standard query language, the data pipeline comprising one or more data pipeline elements, at least one data pipeline element of the one or more pipeline elements being corresponding to a query component of the query in the standard query language; wherein the method is performed using one or more processors. For example, the method is implemented according to at least FIG. 1, FIG. 5, and/or FIG. 7.

In some embodiments, the method further includes the steps of generating a query execution plan based at least in part on the query in the standard query language, wherein the query execution plan comprises an order of query operations, wherein the data pipeline is generated based on the query execution plan. In certain embodiments, the receiving a query in a standard query language generated based on the NL query comprises generating a model query based on the NL query. In some embodiments, the model query is generated based on at least one selected from a group consisting of the NL query, one or more input datasets, and a target dataset. In certain embodiments, the one or more selected computational models include a natural language processing model. In some embodiments, the model result includes a confidence score associated with the generated query in the standard query language. In certain embodiments, the method further includes the steps of receiving an additional query generated based on the model query, wherein the additional query is generated if the confidence score is below a predetermined threshold. In some embodiments, the method further includes the steps of presenting the additional query to a user; receiving an explanation responding to the additional query; and incorporating the explanation into the model query. In certain embodiments, the method further includes the steps of applying the data pipeline to one or more input datasets to generate an output dataset. In some embodiments, the data pipeline uses one or more platform-specific expressions associated with a platform. In some embodiments, the method further includes the steps of applying one or more platform operations associated with the platform to the data pipeline.

According to certain embodiments, a method for generating a data pipeline, the method comprising: receiving a target dataset; receiving a model result generated based on the target dataset, the model result including a query in a standard query language, the model result being generated using one or more computing models; and generating the data pipeline based at least in part on the query in the standard query language, the data pipeline comprising one or more data pipeline elements, at least one data pipeline element of the one or more pipeline elements being corresponding to a query component of the query in the standard query language; wherein the method is performed using one or more processors. For example, the method is implemented according to at least FIG. 1, FIG. 5, and/or FIG. 7.

In some embodiments, the method further includes the steps of generating a query execution plan based at least in part on the query in the standard query language, wherein the query execution plan comprises an order of query operations, wherein the data pipeline is generated based on the query execution plan. In certain embodiments, the receiving a query in a standard query language generated based on the target dataset comprises generating a model query based on the target dataset. In some embodiments, the model query is generated based on at least one selected from a group consisting of the target dataset, one or more input datasets, and an NL query. In certain embodiments, the one or more selected computational models include a natural language processing model. In some embodiments, the model result includes a confidence score associated with the generated query in the standard query language. In certain embodiments, the method further includes the steps of receiving an additional query generated based on the model query, wherein the additional query is generated if the confidence score is below a predetermined threshold. In some embodiments, the method further includes the steps of presenting the additional query to a user; receiving an explanation responding to the additional query; and incorporating the explanation into the model query. In certain embodiments, the method further includes the steps of applying the data pipeline to one or more input datasets to generate an output dataset. In some embodiments, the data pipeline uses one or more platform-specific expressions associated with a platform. In some embodiments, the method further includes the steps of applying one or more platform operations associated with the platform to the data pipeline.

According to certain embodiments, a method for generating a data pipeline description, the method comprising: receiving a data pipeline, the data pipeline including one or more data pipeline elements; receiving a model result generated based on the data pipeline, the model result including a query in a standard query language, the model result being generated using one or more first computing models, a query component of the query in the standard query language being corresponding to one data pipeline element of the one or more data pipeline elements; wherein the method is performed using one or more processors. For example, the method is implemented according to at least FIG. 2, FIG. 6, and/or FIG. 7.

In some embodiments, the method includes the steps of presenting the data pipeline description on a user interface. In certain embodiments, the method includes the steps of transmitting the data pipeline description via a software interface.

For example, some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, while the embodiments described above refer to particular features, the scope of the present disclosure also includes embodiments having different combinations of features and embodiments that do not include all of the described features. In yet another example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments.

Certain embodiments provided for herein include:

1. A method of generating a data pipeline using a natural language (NL) query, comprising:
   receiving an NL query, one or more input datasets, and optionally one or more target datasets;
   generating a model query based on the NL query, the one or more input data sets, and optionally the one or more target datasets;
   selecting a model and implementing the model to determine a model result;
   applying the model result to the one or more input datasets and optionally the one or more target datasets, thus generating a data pipeline; and
   optionally displaying the data pipeline.

2. A method of generating a natural language (NL) description of a data pipeline, comprising:
   receiving an input data pipeline having one or more components;
   generating a first query based on the one or more components of the input data pipeline;
   applying a model to the first query, thus generating an NL description of the input data pipeline; and
   optionally presenting the NL description of the input data pipeline.

What is claimed is:

1. A method for generating a data pipeline, the method comprising:
   receiving a natural language (NL) query and a target dataset including one or more target data types;
   receiving a model result generated based on the NL query and the target dataset, the model result including a query in a standard query language, the model result being generated using one or more computing models, wherein the model result includes a confidence score associated with the query in the standard query language;
   generating the data pipeline based at least in part on the query in the standard query language, the data pipeline comprising one or more data pipeline elements, at least one data pipeline element of the one or more pipeline elements being corresponding to a query component of the query in the standard query language; and
   receiving an additional query generated based on the NL query, wherein the additional query is generated if the confidence score is below a predetermined threshold;
   wherein the data pipeline is configured to generate data of the one or more target data types;
   wherein the method is performed using one or more processors.

2. The method of claim 1, further comprising:
   generating a query execution plan based at least in part on the query in the standard query language, wherein the query execution plan comprises an order of query operations, wherein the data pipeline is generated based on the query execution plan.

3. The method of claim 1, wherein the receiving a model result generated based on the NL query comprises generating a model query based on the NL query.

4. The method of claim 3, wherein the model query is generated based on at least one selected from a group consisting of the NL query, one or more input datasets, and the target dataset.

5. The method of claim 1, wherein the one or more computing models include a natural language processing model.

6. The method of claim 1, further comprising:
   presenting the additional query to a user;
   receiving an explanation corresponding to the additional query; and
   incorporating the explanation into a model query generated based on the NL query.

7. The method of claim 1, further comprising:
   applying the data pipeline to one or more input datasets to generate an output dataset.

8. The method of claim 1, wherein the data pipeline uses one or more platform-specific expressions associated with a platform, the method further comprising:
   applying one or more platform operations associated with the platform to the data pipeline.

9. A method for generating a data pipeline, the method comprising:
   receiving a target dataset including one or more target data types;
   receiving a model result generated based on the target dataset, the model result including a query in a standard query language, the model result being generated using one or more computing models, wherein the model result includes a confidence score associated with the query in the standard query language;
   generating the data pipeline based at least in part on the query in the standard query language, the data pipeline comprising one or more data pipeline elements, at least one data pipeline element of the one or more pipeline elements being corresponding to a query component of the query in the standard query language; and
   receiving an additional query generated based on the target dataset, wherein the additional query is generated if the confidence score is below a predetermined threshold;

wherein the data pipeline is configured to generate data of the one or more target data types;

wherein the method is performed using one or more processors.

10. The method of claim 9, further comprising:

generating a query execution plan based at least in part on the query in the standard query language, wherein the query execution plan comprises an order of query operations, wherein the data pipeline is generated based on the query execution plan.

11. The method of claim 9, wherein the receiving a model result generated based on the target dataset comprises generating a model query based on the target dataset.

12. The method of claim 11, wherein the model query is generated based on at least one selected from a group consisting of the target dataset, an NL query, and one or more input datasets.

13. The method of claim 9, wherein the one or more computing models include a natural language processing model.

14. The method of claim 9, further comprising:

presenting the additional query to a user;

receiving an explanation corresponding to the additional query; and incorporating the explanation into a model query generated based on the target dataset.

15. The method of claim 9, further comprising:

applying the data pipeline to one or more input datasets to generate an output dataset.

16. The method of claim 9, wherein the data pipeline uses one or more platform-specific expressions associated with a platform, the method further comprising:

applying one or more platform operations associated with the platform to the data pipeline.

* * * * *